US012530830B2

(12) United States Patent
Fentzlaff et al.

(10) Patent No.: US 12,530,830 B2
(45) Date of Patent: Jan. 20, 2026

(54) INTERACTIVE 3-D MODEL CREATION THROUGH A DISTRIBUTED COMPUTING INTERACTIVE VIRTUAL ENVIRONMENT

(71) Applicant: Tinker & Bash, Raleigh, NC (US)

(72) Inventors: Stone Paul Fentzlaff, Fairview, NC (US); Garrett William Fentzlaff, Fairview, NC (US)

(73) Assignee: Tinker & Bash, Raleigh, NC (US)

( * ) Notice: Subject to any disclaimer, the term of this patent is extended or adjusted under 35 U.S.C. 154(b) by 163 days.

(21) Appl. No.: 18/192,403

(22) Filed: Mar. 29, 2023

(65) Prior Publication Data

US 2024/0331249 A1    Oct. 3, 2024

Related U.S. Application Data

(60) Provisional application No. 63/362,392, filed on Apr. 2, 2022.

(51) Int. Cl.
*B33Y 50/02* (2015.01)
*A63F 13/46* (2014.01)
(Continued)

(52) U.S. Cl.
CPC .............. *G06T 13/40* (2013.01); *G06T 19/00* (2013.01); *B33Y 50/02* (2014.12)

(58) Field of Classification Search
CPC ......... G06T 13/40; G06T 19/00; G06T 17/00; G06T 19/20; G06T 2219/024;
(Continued)

(56) References Cited

U.S. PATENT DOCUMENTS 10,649,440 B2 * 5/2020 Fenoglietto ............ B33Y 50/02
10,848,335 B1 * 11/2020 Roche .................... G06V 20/20
(Continued)

FOREIGN PATENT DOCUMENTS

WO    WO-2021055454 A1 *  3/2021  ............. A63F 13/63

OTHER PUBLICATIONS

Sky Castle Studios, LLC. 'Hero Forge' [Online]. Dec. 14, 2020 [Date retrieved from Archive.is; Accessed Jan. 27, 2025]. Retrieved from the Internet: <URL: https://www.heroforge.com/intro/>, <URL: https://www.heroforge.com> (Year: 2020).*

(Continued)

*Primary Examiner* — King Y Poon
*Assistant Examiner* — Michelle Hau Ma
(74) *Attorney, Agent, or Firm* — Jeremy Briggs

(57) ABSTRACT

A method for 3-Dimensional (3D) model creation is described. The method may include generating a virtual world and a plurality of virtual objects in the virtual world. Each virtual object may be associated with a physics rule. The method may further include obtaining a first user input to generate a virtual character in the virtual world by combining a first virtual object and a second virtual object from the plurality of virtual objects. The method may further include generating the virtual character based on physics rules associated with the first virtual object and the second virtual object. The method may additionally include obtaining a second user input to 3D print the virtual character into a physical object. The method may further include transmitting a request to a 3D printing system to 3D print the virtual character.

15 Claims, 8 Drawing Sheets

(51) Int. Cl.
  *A63F 13/58* (2014.01)
  *A63F 13/63* (2014.01)
  *B33Y 10/00* (2015.01)
  *B33Y 30/00* (2015.01)
  *B33Y 50/00* (2015.01)
  *G06T 13/40* (2011.01)
  *G06T 19/00* (2011.01)

(58) Field of Classification Search
  CPC . G06T 2219/2008; B33Y 50/02; B33Y 10/00; B33Y 30/00; B33Y 50/00; A63F 13/46; A63F 13/58; A63F 13/63; A63F 13/20; A63F 13/25
  See application file for complete search history.

(56) References Cited

U.S. PATENT DOCUMENTS

| | | | |
|---|---|---|---|
| 10,974,459 B2* | 4/2021 | Withey | G06T 17/005 |
| 2012/0115605 A1* | 5/2012 | Watkins, Jr. | A63F 13/822 |
| | | | 463/32 |
| 2014/0046473 A1* | 2/2014 | Boynton | B29C 64/118 |
| | | | 700/119 |
| 2018/0165701 A1* | 6/2018 | Onda | A63F 13/30 |
| 2019/0270251 A1* | 9/2019 | Nagai | B29C 64/386 |
| 2021/0026142 A1* | 1/2021 | Gotoh | A63F 13/25 |
| 2022/0305378 A1* | 9/2022 | Ward | A63F 13/235 |

OTHER PUBLICATIONS

Carson, Oliver. How to Develop a Scoring System for a Game [Online]. Mar. 28, 2023 [Retrieved on Sep. 23, 2025]. Retrieved from the Internet: <URL: https://www.pubnub.com/how-to/develop-game-scoring-system/ > (Year: 2023).*

* cited by examiner

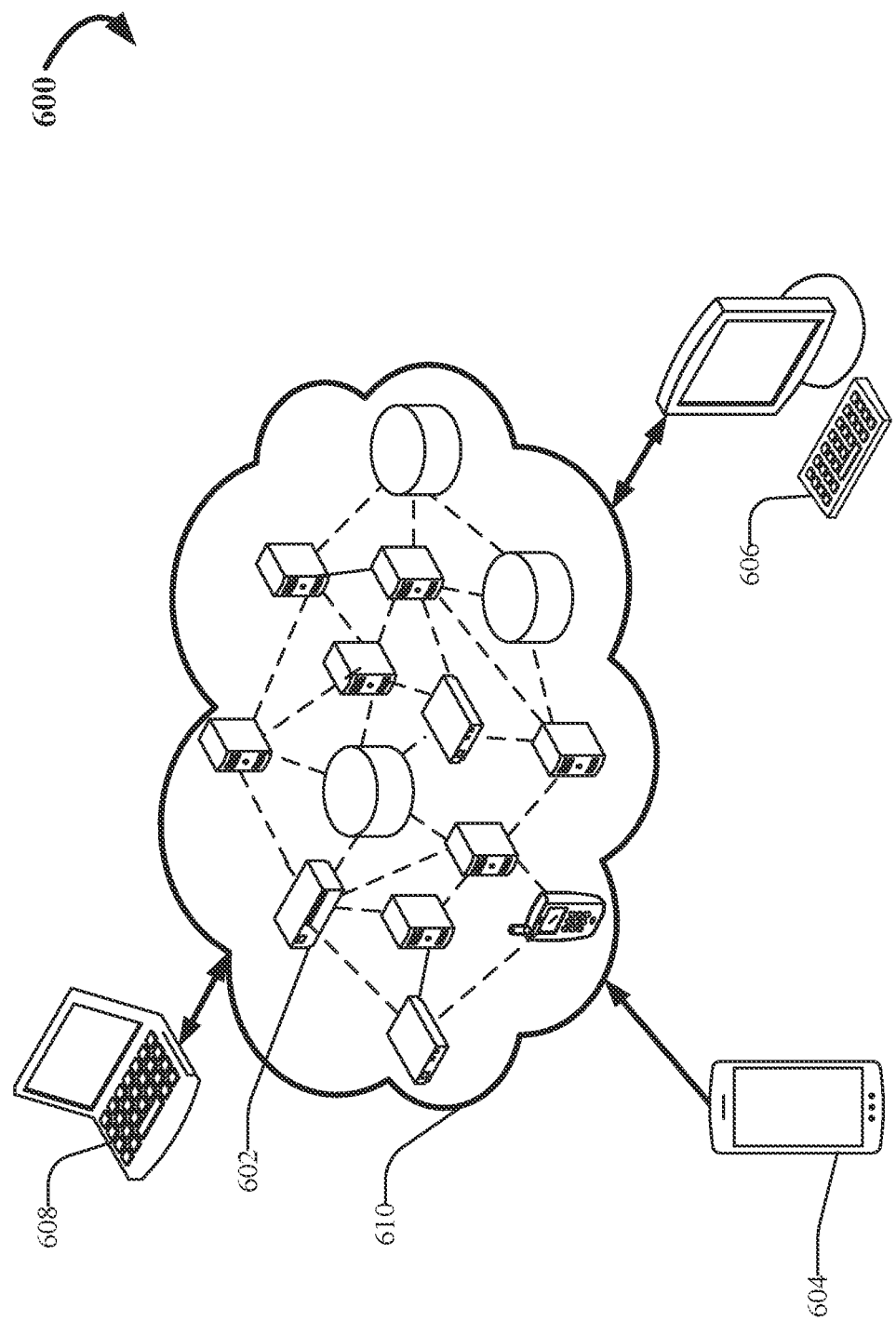

INTERACTIVE 3-D MODEL CREATION THROUGH A DISTRIBUTED COMPUTING INTERACTIVE VIRTUAL ENVIRONMENT

TECHNICAL FIELD

The present disclosure relates to a distributed computing system and method for enabling creation of 3D models, and more particularly, to a distributed computing system and method that facilitate creation of 3D models in an interactive virtual gaming environment and 3D printing of physical objects corresponding to the 3D models.

BACKGROUND

Model builders may visit social networking sites to interact and collaborate on aspects of their craft. They may trade modeling techniques and present projects, images, and writing about their craft that demonstrates their passion for modeling and the resultant creative works. However, conventional social networking sites may not provide appealing ways using which the model builders can collaborate with each other online to build models. Furthermore, the conventional social networking sites may not provide competitive gaming environment to engage the model builders for a longer time duration.

Modern gaming sites may also provide social networking capabilities using which gamers may interact with other gamers in an online environment. However, the gaming sites may not provide aspects of physical creativity that may interest model builders, as the model builders typically desire to build tactile or physical objects using their imagination and construction skills.

Thus, there is a need for a system and method that enables users to build models in a competitive gaming environment, and build tactile or physical objects using the gaming environment.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 6 depicts a cloud-computing environment in accordance with the present disclosure.

DETAILED DESCRIPTION

Overview

Figure 1:
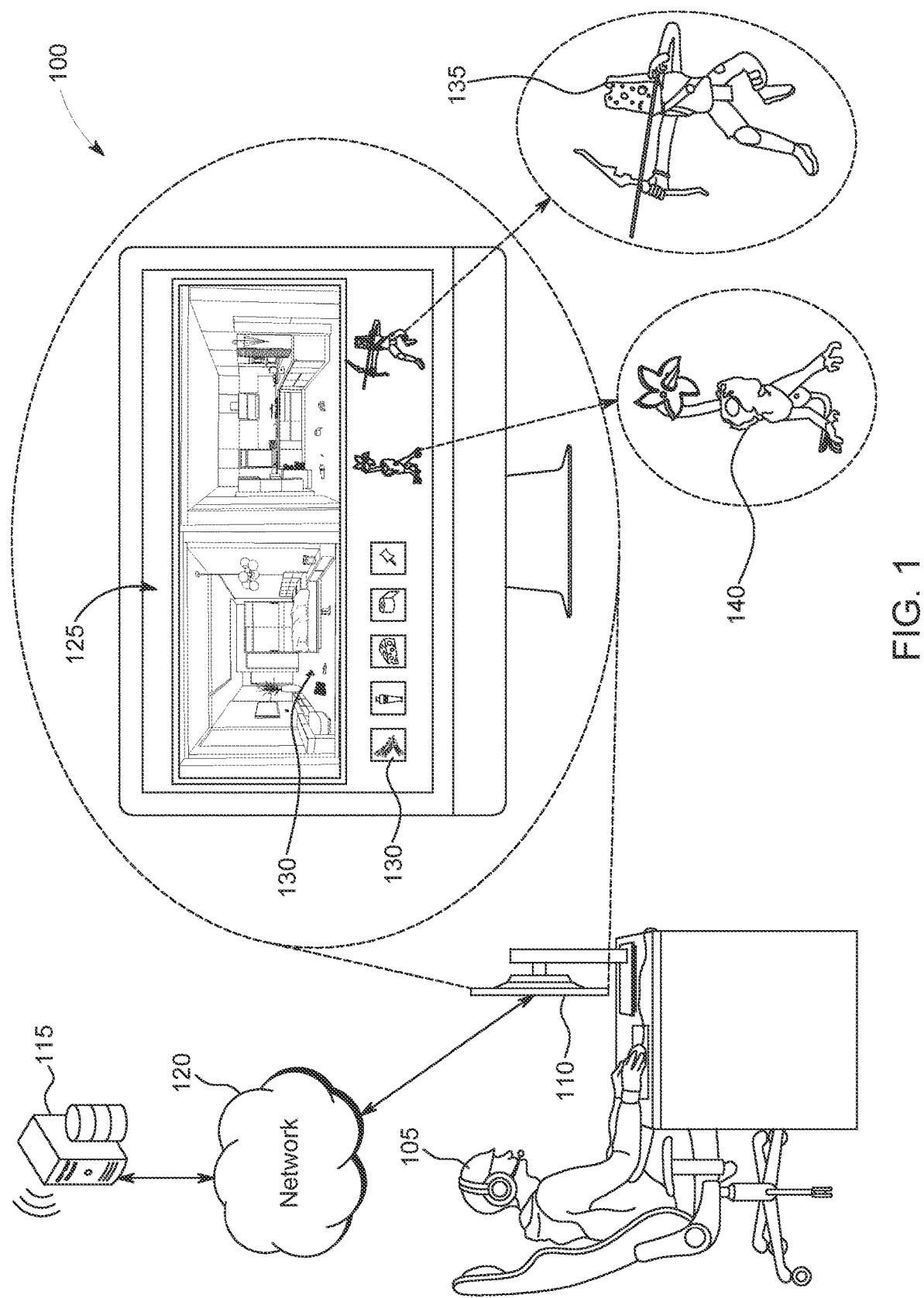
FIG. 1 depicts an example environment in which techniques and structures for providing the systems and methods disclosed herein may be implemented.

The present disclosure describes a computing system and method that enable a user to create 3D models or virtual characters, and 3D print the created virtual characters. The system may generate a virtual world or virtual gaming environment that may include a plurality of virtual objects. The virtual world may be, for example, a virtual house or a room, and the virtual objects may be virtual household items or virtual trash that may be disposed at different virtual house regions. The system may enable the user to virtually move in the virtual house, and select/commandeer virtual objects to combine and generate a virtual character using the virtual objects. For example, the system may enable the user to select a first virtual object (e.g., a virtual thumbtack) and a second virtual object (e.g., a virtual needle), and send a request to the system to "combine" the first virtual object and the second virtual object to generate a virtual character (e.g., a sword).

In some aspects, each virtual object may be associated with a physics rule that may correspond to a virtual object shape. The physics rule may indicate the types and orientations of virtual objects that a particular virtual object may be combined with. For example, the physics rules associated with the first virtual object and the second virtual object may indicate whether combination of the two virtual objects is possible, and ways in which the first and the second virtual objects may be combined.

Responsive to receiving the request for combination of the first virtual object and the second virtual object from the user, the system may determine whether the first virtual object and the second virtual object are combinable (or are "allowed" to be combined) based on their respective physics rules. The system may combine the first virtual object and the second virtual object, and generate the virtual character when the respective physics rules allow the combination. The system may further display the generated virtual character on a system display.

The system may be further configured to calculate a score for the generated virtual character based on various virtual character aspects or traits. The traits may be, for example, physical strength, athletic capability, supernatural powers, speed, etc., associated with the generated virtual character.

In some aspects, the system may enable an option for the user to 3D print the generated virtual character into a tactile or physical object when the calculated score is greater than a threshold. In this case, the user may send a 3D print request to the system, and the system may forward the request to a 3D printing system when the calculated score is greater than the threshold. In some aspects, the "payment" for 3D printing the virtual character may be made based on virtual resources or money that may be associated with the calculated score.

The present disclosure discloses a computing system and method that enables a user to create 3D models or virtual characters in a competitive gaming environment. The user may earn a score or virtual money by using skills in the game play, and may in return 3D print the virtual character created by the user. In this manner, the user may earn a physical reward (e.g., a 3D printed physical object) for the skills that the user may display in the virtual gaming environment provided by the system. The system may further enable the user to trade or share the virtual character (or virtual character parts) created by the user with other users, and hence may promote collaboration in 3D model building.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a user 105 operating a computing device 110. The user 105 may be a gamer or a model builder who may be playing a virtual game on the computing device 110. The computing device 110 may be, for example, a computer, a laptop, a tablet, a mobile phone, or any similar device having communication and gaming capabilities.

The virtual game may be hosted locally on the computing device 110, or may be hosted on a server 115. In the former case, a computing device processor (not shown) may enable the user 105 to play the virtual game on the computing device 110. In the latter case, the computing device 110 may be connected with the server 115 via one or more networks 120 (or a network 120), and the computing device 110 may access the virtual game online via the network 120.

The network 120 may be and/or include the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples. The network 120 can also be and/or include a packet-switched network such as a local area network, wide area network, metropolitan area network, the Internet, or other similar type of network environment.

In some aspects, the computing device processor (or the server 115) may generate a "virtual world" or virtual gaming environment 125 on the computing device 110 for gameplay. The user 105 may use the virtual gaming environment 125 to build or create virtual characters (3D models) on the virtual gaming environment 125. In an exemplary aspect (as shown in FIG. 1), the virtual gaming environment 125 may include a virtual room (or a virtual house), and the computing device processor may generate a plurality of virtual objects 130 that may be placed/disposed in the virtual room/house. The virtual room/house may include one or more different virtual regions including, but not limited to, a virtual water world (e.g., a faucet that may be left open in a virtual kitchen sink), virtual ash (e.g., a virtual fireplace), a virtual jungle (e.g., virtual overgrown houseplants), a virtual chandelier, a virtual desert world (e.g., dust accumulated on hardwood flooring), etc. Each virtual region may include one or more virtual objects of the plurality of virtual objects 130.

The plurality of virtual objects 130 may include, for example, pins, cheese, papers or tissues, flowers, pots, marbles, rubber band, piece of glass, part of bedspring, a can top, and/or the like. The user 105 may select two or more virtual objects, from the plurality of virtual objects 130, and send a request to the computing device processor to "combine" the selected two or more virtual objects in a specific manner and gradually create a virtual character. For example, the user 105 may select (or commandeer) virtual objects associated with a marble or a piece of cheese to create a virtual character head. Similarly, the user 105 may commandeer additional virtual objects to create other body parts, weapons, vehicles, etc. for the virtual character. Examples of created virtual characters are shown in FIG. 1 as a warrior 135 or a figurine 140 (hereinafter, referred to as a virtual character 135/140). It should be appreciated that the disclosed examples of the warrior 135 or the figurine 140 are not limiting and are provided to illustrate example virtual character(s).

The computing device processor may enable the user 105 to make a virtual character (e.g., a partially created virtual character) travel around the virtual room/house to collect the virtual objects 130 and create virtual character's body, weapons, vehicles, clothing, and other virtual character aspects. The computing device processor may place or dispose the virtual objects 130 in the virtual room/house based on ease or difficulty of locating the virtual objects 130. Specifically, the computing device processor may utilize datasets or instructions stored in a computing device memory or a server memory (not shown) to control ease or difficulty of locating the virtual objects 130 in the virtual room/house.

A person ordinarily skilled in the art may appreciate from the description above that the virtual gaming environment 125 (or the virtual world) generated by the computing device processor may be associated with or similar in theme to kitbashing or modelbashing (e.g., a practice whereby a new scale model is created by taking pieces out of commercially available model kits to construct new and unique models). Specifically, the computing device processor (or the server 115) may be configured to generate a virtual kitbashing or modelbashing gaming environment, using which the gamers or model builders can create 3D models in a competitive gaming environment.

In some aspects, each virtual object 130 placed in the virtual room/house may be associated with one or more physics rules that may correspond to a virtual object 130 shape. Physics rules may be datasets that include physics modeling rules indicating the shapes of virtual objects that may be combined with other virtual objects. Stated another way, each virtual object may have associated datasets (i.e., physics rule) that may indicate the way the virtual object may be attached or combined with other virtual objects, the ways in which the virtual object may be used, etc. For example, if the user 105 selects a first virtual object and a second virtual object for "combination" to form a virtual character body part, and sends the request to the computing device processor to combine the first and second virtual objects in a specific manner/position, the computing device processor may first determine whether combination of the first and second virtual objects is possible by using the physics rules associated with the first and second virtual objects. The computing device processor may combine the first and second virtual objects and create the virtual character body part when the associated physics rules "allow" the combination of the first and second virtual objects. On the other hand, the computing device processor may output an error notification on a computing device display screen when the associated physics rules do not allow the combination of the first and second virtual objects in the specific manner/position. As an example, the physics rule may allow a virtual thumbtack to be attached to the virtual character 135/140 as a hilt of a sword, however the rule may not allow the virtual thumbtack to act as a virtual character head. Similarly, the physics rule may allow a virtual needle to act as a sword, however the rule may not allow the virtual needle to act as a virtual character chest.

In further aspects, each virtual object 130 may be associated with one or more construction characteristics. In particular, the construction characteristics may indicate virtual actions that may be required to be performed by the user 105 in the virtual gaming environment 125 to combine the virtual objects selected by the user 105 to create the virtual character 135/140. Examples of construction characteristics include, but are not limited to, weaving, bonding, sewing, gluing, welding, cutting, grinding, or sanding, removably bonding (e.g., putty), patching or repairing, melting/casting/smelting, heating or cooling, sharpening, and/or the like. As an example, if the user 105 selects the virtual needle and the virtual thumbtack to create a weapon (e.g., a sword and a hilt) for the virtual character 135/140, the user 105 may have to perform virtual welding of the virtual needle and the virtual thumbtack. In some aspects, the user 105 may perform the virtual welding when the computing device processor allows combining of the virtual needle and the virtual thumbtack in the specific manner. In further aspects, the computing device processor may prompt (e.g., via a notification on the computing device display screen) the user 105 to perform virtual welding of the virtual needle and the virtual thumbtack before the computing device processor may combine the virtual needle and the virtual thumbtack to create the weapon.

In additional aspects, each virtual object 130 may be associated with one or more physical or strength characteristics. Examples of physical or strength characteristics include, but are not limited to, a tensile strength, a shear strength, a modulus of elasticity, a melting point, a freezing point, an exothermic potential, an endothermic potential, supernatural potential, and/or the like.

In some aspects, the computing device processor may be configured to calculate a first score for the created virtual character 135/140 based on the strength characteristics associated with the virtual objects 130 that may have been combined to form the virtual character 135/140, and the virtual object 130 positions in the created virtual character 135/140. The first score may be indicative of physical strength, athletic ability, supernatural powers, speed, etc. of the virtual character 135/140. In further aspects, the first score may be indicative of class of the created virtual character 135/140 (e.g., knight, minister, mage, etc.), accuracy, complexity, beauty, speed, elegance, etc. of one or more weapons created for the virtual character 135/140. In additional aspects, the first score may be indicative of strength of sails, gliders, propped planes, speed, maneuverability, weight capacity, cargo, or passenger capacity, etc. for vehicles or ships created for the virtual character 135/140, and/or the like.

As an example, if the user 105 has created the virtual character 135/140 by using one or more exotic virtual objects having supernatural powers (such virtual objects may be difficult to locate in the virtual gaming environment 125), the computing device processor may calculate a higher first score for the virtual character 135/140. On the other hand, if the user 105 has created the virtual character 135/140 using virtual objects that may have low tensile strength, the computing device processor may calculate a low first score for the virtual character 135/140.

In further aspects, the computing device processor may determine a time duration that the user 105 may have spent playing the virtual game for creating/generating the virtual character 135/140 (e.g., time duration spent before creating/generating the virtual character 135/140). The computing device processor may calculate a second score for the created virtual character 135/140 based on the determined time duration. In some aspects, the computing device processor may assign a higher second score to the virtual character 135/140 when the user 105 spends less time to create the virtual character 135/140. On the other hand, the computing device processor may assign a lower second score to the virtual character 135/140 when the user 105 spends relatively more time to create the virtual character 135/140.

In yet another aspect, the computing device processor may provide multi-player gaming competition virtual environment. In the multi-player gaming competition virtual environment, the virtual character 135/140 created by the user 105 may compete (e.g., fight) virtually with a virtual character created by another user (not shown) based on commands or instructions provided by the user 105 and the other user. The computing device processor may calculate a third score for the virtual character 135/140 based on a count or magnitude of hits or attacks executed by the virtual character 135/140 on the opponent. In further aspects, the user 105 may create a "crew" of virtual characters that may virtually compete with a crew of virtual characters created by the other user. In this case, the computing device processor may calculate the third score based on the count or magnitude of hits or attacks executed by the crew created by the user 105 against opponent's crew.

In additional aspects, the virtual character 135/140 may virtually compete with virtual characters that may be created by the computing device processor itself (e.g., virtual characters that may not have been created by any user). Examples of such virtual characters may include virtual pirates or non-player characters that may be configured to virtually "fight" or compete with the virtual character 135/140 created by the user 105. In this case, the computing device processor may calculate the third score based on the count or magnitude of hits or attacks executed by the virtual character 135/140 on the virtual characters created by the computing device processor.

The user 105 and/or the computing device processor may perform one or more actions based on the calculated first score, the second score and/or the third score. The action(s) may be understood in detail in conjunction with FIG. 2 and FIG. 3.

Figure 2:
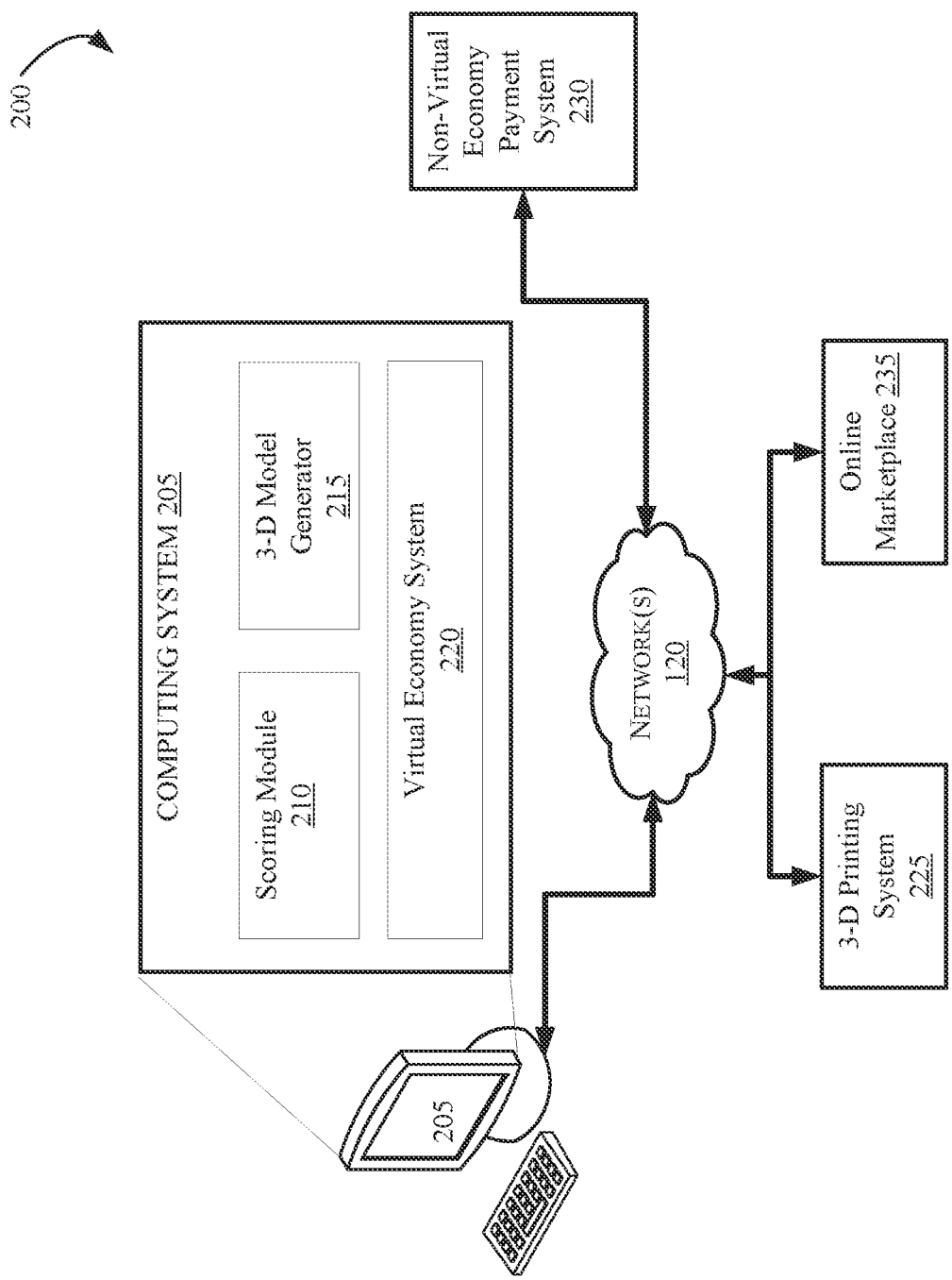
FIG. 2 illustrates a block diagram of a system for collaborative creation of 3D models and physical objects in a distributed computing environment.

FIG. 2 illustrates a block diagram of a system 200 for collaborative creation of 3D models and physical objects in a distributed computing environment. The system 200 may include a computing system 205 that may be the same as the computing device 110 or the server 115 described in conjunction with FIG. 1. In the aspect where the computing system 205 is the computing device 110, the computing system 205 may include the computing device processor (not shown) described in conjunction with FIG. 1. On the other hand, in the aspect where the computing system 205 is the server 115, the computing system 205 may connect with the computing device 110 via the network 120, as described above.

The computing system 205 may generate the virtual gaming environment 125 (e.g., a virtual world) and enable the user 105 to build 3D models (e.g., the virtual character 135/140) in the virtual gaming environment 125. Further, the computing system 205 may enable the user 105 to compete against other users in the virtual gaming environment 125 by using the virtual character 135/140 and the virtual characters created by the other users, as described above in conjunction with FIG. 1. In the multi-player gaming environment, the computing system 205 may connect with computing systems (not shown) of other users via the network 120.

The computing system 205 may include a plurality of units or modules including, but not limited to, a scoring module 210, a 3D model generator 215 and a virtual economy system 220, which are communicatively coupled to each other. The 3D model generator 215 may be configured to generate the virtual character 135/140 by using the virtual objects 130 commandeered or selected by the user 105, as described above in conjunction with FIG. 1. Specifically, when the user 105 selects the virtual objects 130 on the virtual gaming environment 125 for combination in a specific/desired manner, the computing system 205 may determine whether the virtual objects 130 are combinable based on respective physics rules, as described above. The computing system 205 may command the 3D model generator 215 to create/generate the virtual character 135/140 (or a body part, weapon, or vehicle associated with the virtual character 135/140), when the computing system 205 determines that the combination of the virtual objects 130 is allowed based on the respective physics rules.

Further, the scoring module 210 may be configured to calculate the first score, the second score and/or the third score for the virtual character 135/140. The concept of the first score, the second score and the third score is already described above in conjunction with FIG. 1, and is not described again here for the sake of simplicity and conciseness.

In some aspects, the scoring module 210 may be further configured to calculate a "final" score for the virtual character 135/140 based on the calculated first score, the second score and the third score. The final score may be a linear average of the first score, the second score and the third score, or may be a weighted average. In other aspects, the final score may be based only on the first score and the second score. In yet another aspect, either one of the first score, the second score, or the third score may be the final score.

Responsive to calculating the final score, the scoring module 210 may send the final score to the virtual economy system 220. The virtual economy system 220 may receive the final score, and correlate "virtual resources" ("virtual money") with the final score. For example, the virtual economy system 220 may correlate "100" final score with "100" virtual US Dollars, or may correlate "100" final score with "10" virtual US Dollars. The conversion of final score to virtual resources may be based on a mapping/lookup table or a predefined ruleset that may be pre-stored in a computing system memory (not shown). The virtual economy system 220 may fetch the ruleset from the computing system memory, and may use the ruleset to convert the final score into virtual resources.

The computing system 205 may further enable virtual character 135/140 conversion into a physical object when the virtual resources exceed a predefined threshold. Specifically, the computing system 205 may compare the virtual resources with the predefined threshold, and may enable an option for the user 105 in the virtual gaming environment 125 to send a command/request to 3D print the virtual character 135/140 created by the user 105 by using the virtual resources, when the virtual resources exceed the predefined threshold. For example, the computing system 205 may enable the option to 3D print the virtual character 135/140 when the virtual resources exceed 100 US Dollars.

The user 105 may send the request to 3D print the virtual character 135/140 to the computing system 205 when the corresponding option is enabled for the user 105 in the virtual gaming environment 125. Responsive to receiving the request from the user 105, the computing system 205 may send the request to a 3D printer system 225 via the network 120. In addition to sending the request to the 3D printer system 225, the computing system 205 may transfer predefined virtual resources from the virtual economy system 220 to a non-virtual economy payment system 230. For example, the computing system 205 may transfer 50 US Dollar virtual resources from the virtual economy system 220 to the non-virtual economy payment system 230.

Responsive to receiving the 50 US Dollar virtual resources, the non-virtual economy payment system 230 may convert the virtual resources into non-virtual resources or money by using a predefined conversion rule that may be stored in a non-virtual economy payment system memory (not shown). For example, the non-virtual economy payment system 230 may convert 50 US Dollar virtual resources into 20 US Dollars of non-virtual money. The non-virtual economy payment system 230 may then transfer the non-virtual money to the 3D printer system 225 via the network 120.

Responsive to receiving the request to 3D print the virtual character 135/140 from the computing system 205 and the non-virtual money from the non-virtual economy payment system 230, the 3D printer system 225 may 3D print the virtual character 135/140 to create a physical object corresponding to the virtual character 135/140. In further aspects, the 3D printer system 225 may mail the physical object to a user 105 address.

A person ordinarily skilled in the art may appreciate from the description above that the present disclosure provides a virtual environment to the user 105, using which the user 105 may create 3D models or virtual characters in a competitive gaming environment and may convert the "virtual creation" into tactile, real-life physical objects. Since the user 105 "pays" for 3D printing the virtual character 135/140 via the scores earned by the user 105 during game play in the virtual gaming environment 125, the user 105 may engage with the virtual gaming environment 125 for a longer time duration (e.g., to obtain higher score and hence higher virtual resources) and hence may not get disinterested in the game play quickly.

In additional aspects, the computing system 205 may enable the user 105 to trade the virtual character 135/140 or different body parts, weapons, vehicles, etc. created by the user 105 on an online marketplace 235. In this case, the computing system 205 may enable an option for the user 105 to trade on the online marketplace 235 when the virtual resources in the virtual economy system 220 exceeds another threshold (e.g., a second threshold). For example, the computing system 205 may enable the option for the user 105 to trade on the online marketplace 235 when the virtual resources exceed 25 US Dollars. In other aspects, the computing system 205 may enable the option for the user 105 to trade on the online marketplace 235 anytime, irrespective of virtual resources.

The user 105 may upload user 105 virtual creations (e.g., the virtual character 135/140 or different body parts, weapons, vehicles, etc. created by the user 105) on the online marketplace 235 when the corresponding option is enabled for the user 105 in the virtual gaming environment 125. The user 105 may "sell" the user 105 virtual creation for virtual resources on the online marketplace 235, or may "buy" virtual creations created by other users. In this manner, the computing system 205 may enable to user 105 to market or publicize the user 105 virtual creations, and may additionally enable the user 105 to collaborate with other users in model building. For example, the user 105 may buy a weapon created by another user, if the user 105 desires to use the weapon in the virtual character 135/140 created by the user 105.

Figure 3:
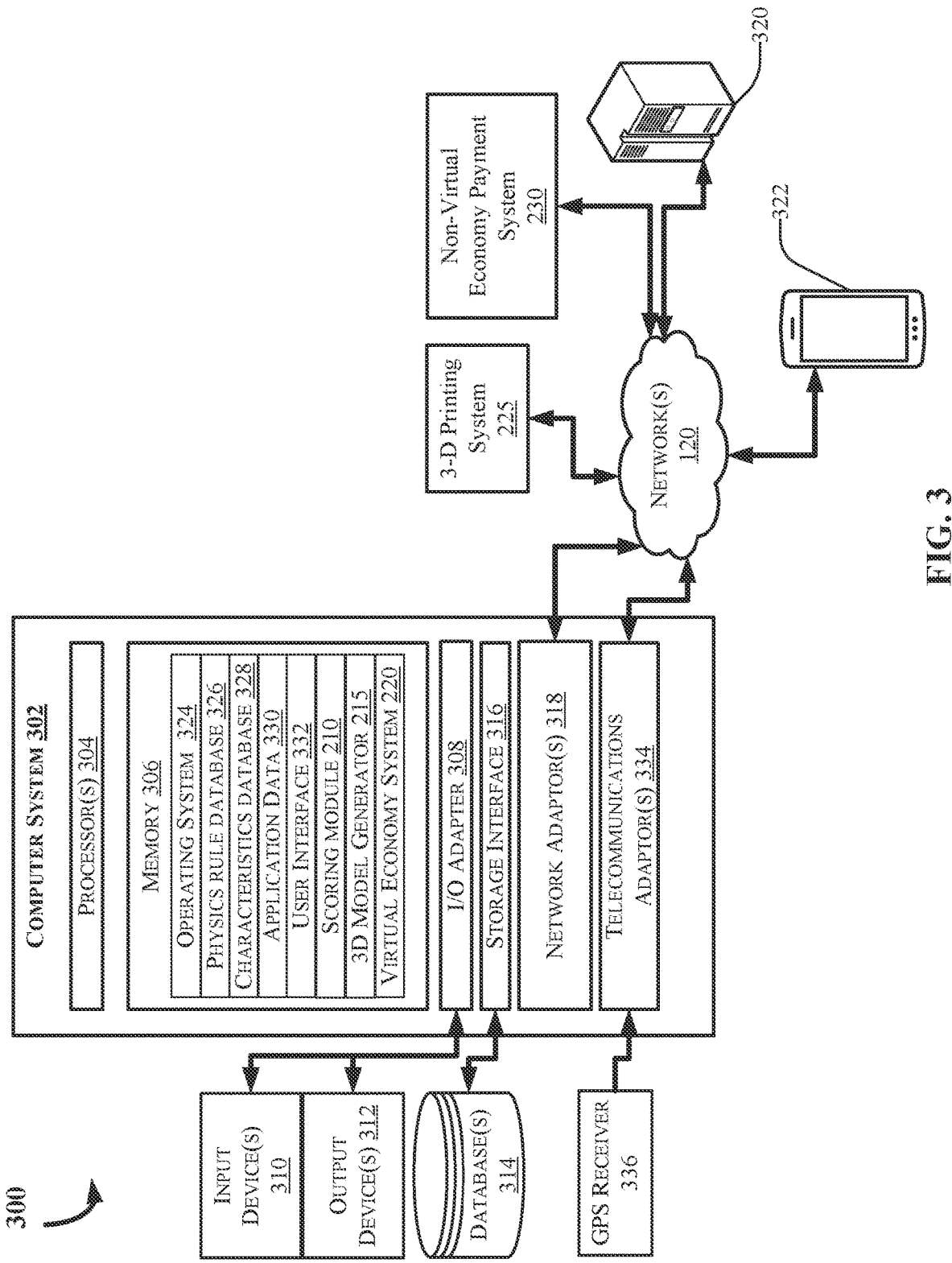
FIG. 3 illustrates a block diagram of an example computing environment and computer system for use in practicing the embodiments described herein.

FIG. 3 illustrates a block diagram of an example computing environment 300 and a computer system 302 for use in practicing the embodiments described herein. The environment 300 and the computer system 302 described herein can be implemented in hardware, software (e.g., firmware), or a combination thereof. The computer system 302 may be representative of one or more of the computing systems depicted with respect to FIGS. 1, 2, 6, and 7. For example, the computer system 302 may be substantially similar or identical to the computing system 205 as shown with respect to FIG. 2, and computer 606 as shown with respect to FIG. 6. Specifically, the computer system 302 may be configured to perform substantially similar functions as described above with respect to the computing system 205.

The computer system 302 may include the one or more processor(s) 304, a memory 306 communicatively coupled to the one or more processor(s) 304, and one or more input/output adaptors 308 that can communicatively connect with external devices such as, for example, input devices 310 (e.g., receiver(s)) and/or output devices 312. In some aspects, the input devices 310 can include, for example, a keyboard, a mouse, a joystick, a microphone, a sensor, etc. The input device(s) 310 may also include one or more virtual keyboard(s) on a touchscreen interface, or another conventional input device. The output devices 312 can include, for example, a display, a speaker, a touchscreen, etc. Other output devices can also be included, although not shown in FIG. 3.

The I/O devices 310 and 312 that may be connectable to the I/O adaptor 308 may further include devices that communicate both inputs and outputs, for instance, but are not limited to, a network interface card (NIC) or modulator/demodulator (for accessing other files, devices, systems, or a network), a radio frequency (RF) or other transceiver, a Near Field Communication (NFC) device, a Bluetooth® Low energy receiver, an ad-hoc networking device, a bridge, a router, etc.

The computer system 302 may operatively connect to and communicate information with one or more internal and/or external memory devices such as, for example, one or more databases 314 via a storage interface 316. In some aspects, the databases 314 may store templates of virtual objects that the computer system 302 may fetch, via the storage interface 316, to generate or display the virtual objects 130 in the virtual gaming environment 125.

The computer system 302 may also include one or more network adaptor(s) 318 enabled to communicatively connect the computer system 302 with the network 120. The computer system 302 may communicatively connect with one or more server(s) 320, one or more mobile devices 322, the 3D printer system 225 and the non-virtual economy payment system 230, via the network 120. In an exemplary aspect, the server 320 may be configured to host the online marketplace 235 described in conjunction with FIG. 2. Further, the mobile device 322 may be same as the computing device 110 described in conjunction with FIG. 1.

The one or more processor(s) 304 may be collectively a hardware device for executing program instructions (aka software), stored in a computer-readable memory (e.g., the memory 306). The one or more processor(s) 304 can be a custom made or commercially available processor, a central processing unit (CPU), a plurality of CPUs, an auxiliary processor among several other processors associated with the computer system 302, a semiconductor-based microprocessor (in the form of a microchip or chip set), or generally any device for executing instructions.

The one or more processor(s) 304 may be disposed in communication with one or more memory devices (e.g., the memory 306 and/or one or more external databases 314, etc.) via the storage interface 316. The storage interface 316 can also connect to one or more memory devices including, without limitation, one or more databases 314, and/or one or more other memory drives (not shown in FIG. 3) including, for example, a removable disc drive, a computing system memory, cloud storage, etc., employing connection protocols such as serial advanced technology attachment (SATA), integrated drive electronics (IDE), universal serial bus (USB), fiber channel, small computer systems interface (SCSI), etc.

The memory 306 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The instructions in the memory 306 can include one or more separate programs, each of which can include an ordered listing of computer-executable instructions for implementing logical functions. In the example of FIG. 3, the instructions in the memory 306 can include an operating system 324. The operating system 324 can control the execution of other computer programs such as, for example the 3D model generator 215 as shown in FIG. 2, the virtual economy system 220, the scoring module 210, one or more physics engines, data structure interactive engines, etc., and provides scheduling, input-output control, file and data management, memory management, and communication control and related services. Although FIG. 3 shows the 3D model generator 215, the virtual economy system 220 and the scoring module 210 as part of the memory 306, in some aspects, all or some of these units may be outside of the memory 306.

In other aspects, the instructions in the memory 306 may provide character interaction rules (e.g., interaction between different virtual objects 130 or between different virtual characters/3D models), part interaction rules, physics modeling rules, instruction sets for visual output and game play, scoring systems, and other mechanisms. In some aspects, the memory 306 may include one or more databases including, but not limited to a physics rule database 326 and a characteristics database 328. The physics rule database 326 may store physics rules (and/or character interaction rules, part instruction rules, etc., described above) associated with each virtual object 130, and the characteristics database 328 may store physical or strength characteristics, construction characteristics, and/or the like associated with each virtual object 130, as described above in conjunction with FIG. 1.

The program instructions stored in the memory 306 can further include application data 330, and instructions for controlling and/or interacting with the computer through a user interface 332.

According to some example embodiments, the computer system 302 can further include one or more telecommunications adaptor(s) 334 that may be disposed in communication with mobile telecommunications infrastructure such as, for example, mobile phone towers, satellites, vehicle-to-vehicle network infrastructure, etc. The telecommunications adaptor(s) 334 can also include and/or be disposed in communication with or more other adaptors configured and/or programmed to transmit and/or receive cellular, mobile, and/or other communications protocols for wireless communication. The telecommunications adaptor(s) 334 can also include and/or be disposed in communication with a global positioning system (GPS) receiver 336. In an exemplary aspect, the processor 304 may use the GPS signal received from the GPS receiver 336, via the telecommunications adaptor(s) 334, to determine a location of the user 105 who may be using the computer system 302 to play the virtual game in the virtual gaming environment 125. Responsive to determining user 105 location, the processor 304 may generate location specific virtual objects 130 for the user 105 (e.g., by using templates of virtual objects stored in the databases 314).

In operation, the processor 304 may be configured to generate (by using instructions stored in the 3D model generator 215) the virtual world or the virtual gaming environment 125 using which the user 105 can play the virtual game and create 3D models or the virtual character 135/140, as described above in conjunction with FIGS. 1 and 2. In addition, the processor 304 may generate (by using instructions stored in the 3D model generator 215) the plurality of virtual objects 130 and place them in different virtual room/house regions, as described above.

In some aspects, the processor 304 may generate the plurality of virtual objects 130 by fetching templates of virtual objects from the database 314, via the storage interface 316. In other aspects, the templates of virtual objects may be pre-stored in the memory 306, and the processor 304 may fetch the templates from the memory 306 to generate the plurality of virtual objects 130.

In addition, each virtual object 130 may have associated physics rules and characteristics (e.g., strength characteristics and/or construction characteristics), as described above. In an exemplary aspect, the processor 304 may create the physics rules and characteristics for each virtual object 130, when the processor 304 generates the plurality of virtual objects 130. The processor 304 may send the created physics rules and characteristics to the physics rule database 326 and the characteristics database 328 for storage purpose.

In other aspects, the associated physics rules and characteristics may be pre-stored along with the templates of virtual objects in the database 314 or the memory 306. In this case, the processor 304 may fetch the pre-stored physics rules and characteristics when the processor 304 fetches the templates of virtual objects to generate the plurality of virtual objects 130.

The processor 304 may display the generated virtual gaming environment 125 and the plurality of virtual objects 130 on the output device 312 (e.g., a computer system display). The user 105 may play the virtual game in the virtual gaming environment 125 by using the input device 310, and send a first user input to the processor 304, via the I/O adapter 308, to generate the virtual character 135/140 (or body part, weapon, vehicle, etc. for the virtual character 135/140). The first user input may indicate two or more virtual objects (e.g., a first virtual object and a second virtual object) that the user 105 may desire to combine to generate the virtual character 135/140. For example, the first user input may indicate that the user 105 may desire to combine a virtual thumbtack and a virtual needle to generate a virtual sword for the virtual character 135/140.

The processor 304 may obtain the first user input from the I/O adapter 308 and may determine whether the first virtual object and the second virtual object are combinable based on physics rules associated with the first virtual object and the second virtual object, as described above. The processor 304 may output an error message, via the output device 312, when the processor 304 determines that the first virtual object and the second virtual object cannot be combined based on physics rule. On the other hand, the processor 304 may output an "action" notification on the output device 312, when the processor 304 determines that the user 105 may have to perform a virtual action on the virtual gaming environment 125 before combining the first virtual object and the second virtual object. The virtual action may be, for example, welding or gluing, and the processor 304 may determine the virtual action based on the construction characteristics associated with the first virtual object and the second virtual object.

In further aspects, the processor 304 may generate (by using the instructions stored in the 3D model generator 215) the virtual character 135/140 (or associated body part, weapon, vehicle, etc.) when the processor 304 determines that the first virtual object and the second virtual object may be combined based on the associated physics rule. Responsive to generating the virtual character 135/140, the processor 304 may display the virtual character 135/140 on the output device 312.

The user 105 may virtually compete (e.g., "fight") with virtual characters of other users (or the virtual characters generated by the computer system 302 itself) by using the generated virtual character 135/140, or may create other body parts, weapons, vehicles for the virtual character 135/140, when the virtual character 135/140 is displayed on the output device 312. The processor 304 may calculate the first score, the second score and/or the third score for the virtual character 135/140 as the user 105 plays the virtual game, as described above in conjunction with FIG. 1. In some aspects, the processor 304 may use instructions stored in the scoring module 210 to calculate the first, the second and the third scores. In addition, the processor 304 may calculate the final score for the virtual character 135/140 (by using the instructions stored in the scoring module 210), as described above.

In an exemplary aspect, the final score may be based only on the first score (e.g., the score indicative of virtual physical strength, virtual athletic ability, virtual supernatural powers, class, etc. of the virtual character 135/140). In another aspect, the final score may be based only on the second score (e.g., the score indicative of the time duration taken by the user 105 to create the virtual character 135/140). In yet another aspect, the final score may be based only on the third score. In another aspect, the final score may be a linear or a weighted average of the first score, the second score and the third score.

The processor 304 may send the calculated final score to the virtual economy system 220, which may convert the final score to virtual resources or money, as described above. The virtual economy system 220 may use a first conversion table (that may be pre-stored in the memory 306) to convert the final score to the virtual resources or money. The virtual economy system 220 may then send the virtual resources or money to the memory 306 for storage purpose.

The processor 304 may be further configured to obtain a second user input from the user 105 via the I/O adapter 308. The second user input may be associated with a request to 3D print the virtual character 135/140, and the user 105 may send the second user input to the I/O adapter 308 via the input device 310.

Responsive to obtaining the second user input, the processor 304 may determine whether the virtual resources or money stored in memory 306 is greater than a threshold. Stated another way, if the final score is based only on the first score, the processor 304 may determine whether the first score is greater than a first predefined threshold (that may be pre-stored in the memory 306). On the other hand, if the final score is based only on the second score, the processor 304 may determine whether the second score is greater than a second predefined threshold (that may be pre-stored in the memory 306).

Responsive to determining that the virtual resources or money is less than the threshold (or the first/second score is less than the first/second predefined threshold), the processor 304 may output, via the I/O adapter 308, an error notification on the output device 312. The error notification may indicate to the user 105 that since the virtual resources or money is less than the threshold, the computer system 302 may not accept the request to 3D print the virtual character 135/140.

On the other hand, responsive to determining that the virtual resources or money is greater than the threshold (or the first/second score is greater than the first/second predefined threshold), the processor 304 may "enable" virtual character 135/140 3D printing. Specifically, in this case, the processor 304 may send a command to the 3D model generator 215 to fetch a data file associated with the virtual character 135/140. The data file may include, for example, dimensions, design, color, etc. related details associated with the virtual character 135/140.

The processor 304 may obtain the data file from the 3D model generator 215, and may transmit the data file, along with the request to 3D print the virtual character 135/140, to the 3D printer system 225 via the network 120. In addition, the processor 304 may transmit, via the network 120, the virtual resources or money to the non-virtual economy payment system 230, as described above. The non-virtual economy payment system 230 may convert the virtual resources or money into non-virtual money by using a second conversion table (that may be pre-stored in a non-virtual economy payment system memory, not shown), and transmit the non-virtual money to the 3D printer system 225 via the network 120.

Responsive to receiving the data file, the request to 3D print the virtual character 135/140, and the non-virtual money, the 3D printer system 225 may 3D print the virtual character 135/140 into a tactile or physical object. In addition, 3D printer system 225 may mail the physical object to the user 105 address (that may be pre-stored in a 3D printer system memory, not shown).

Figure 4:
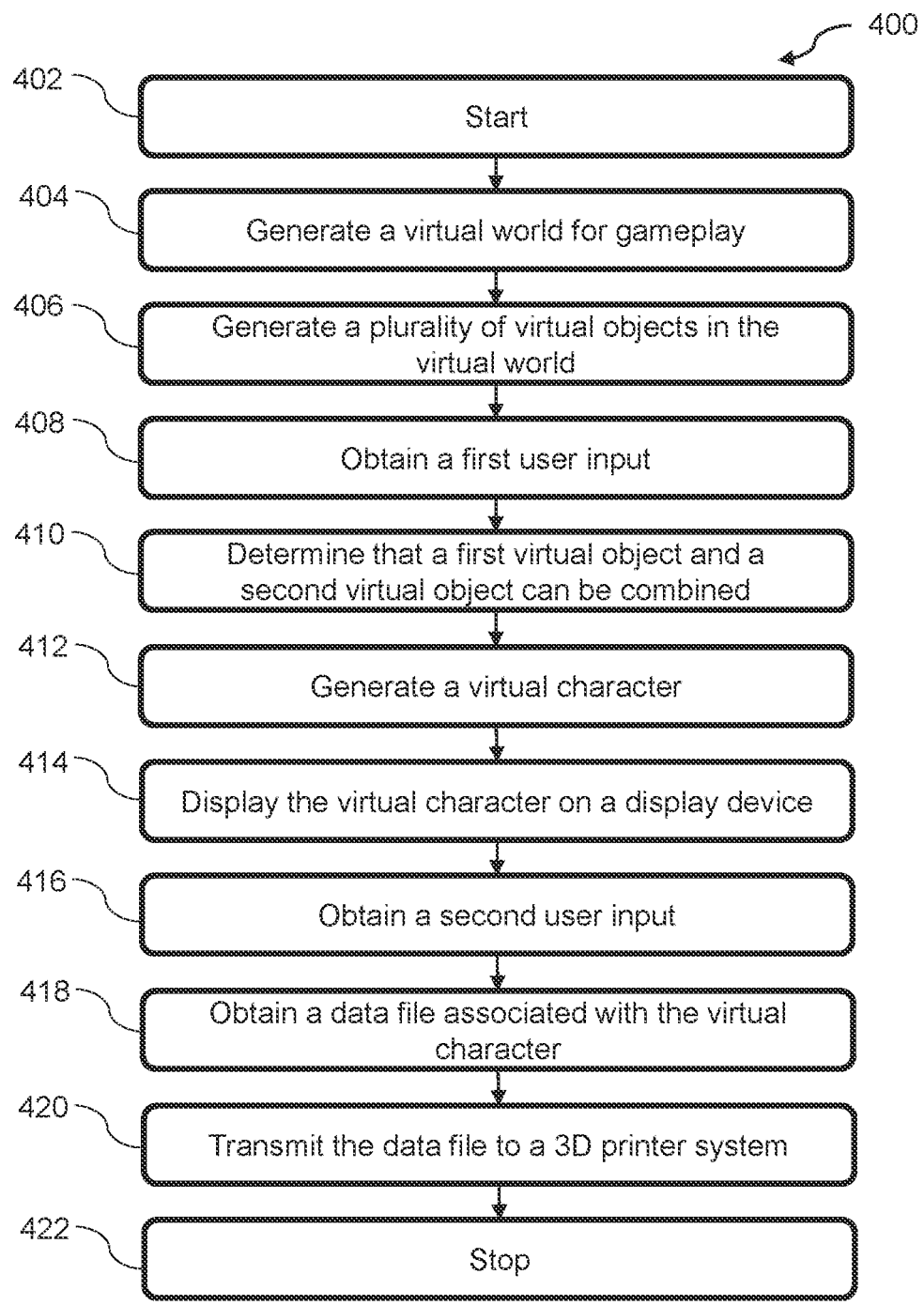
FIG. 4 depicts a flow diagram of an example first method for providing 3-Dimensional (3D) gaming environment in accordance with the present disclosure.

FIG. 4 depicts a flow diagram of an example first method 400 for providing 3-Dimensional (3D) gaming environment in accordance with the present disclosure. FIG. 4 may be described with continued reference to prior figures, including FIGS. 1-3. The following process is exemplary and not confined to the steps described hereafter. Moreover, alternative embodiments may include more or less steps that are shown or described herein and may include these steps in a different order than the order described in the following example embodiments.

Referring to FIG. 4, at step 402, the method 400 may commence. At step 404, the method 400 may include generating, by the processor 304, the virtual world or the virtual gaming environment 125 for gameplay. At step 406, the method 400 may include generating, by the processor 304, the plurality of virtual objects 130 in the virtual world. As described above, each virtual object 130 may associated with a physics rule.

At step 408, the method 400 may include obtaining, by the processor 304, the first user input to generate the virtual character 135/140 in the virtual world by combining the first virtual object and the second virtual object from the plurality of virtual objects 130. At step 410, the method 400 may include determining, by the processor 304, that the first virtual object and the second virtual object are combinable based on physics rules associated with the first virtual object and the second virtual object.

At step 412, the method 400 may include generating, by the processor 304, the virtual character 135/140 based on a determination that the first virtual object and the second virtual object are combinable. At step 414, the method 400 may include displaying, by the processor 304, the virtual character 135/140 on the output device 312.

At step 416, the method 400 may include obtaining, by the processor 304, the second user input to 3D print a physical object corresponding to the virtual character 135/140. At step 418, the method 400 may include obtaining, by the processor 304, the data file associated with the virtual character 135/140 responsive to obtaining the second user input. As described above, the processor 304 may obtain the data file from the 3D model generator 215.

At step 420, the method 400 may include transmitting, by the processor 304, the data file to the 3D printer system 225 to 3D print the physical object.

At step 422, the method 400 may end.

Figure 5A:
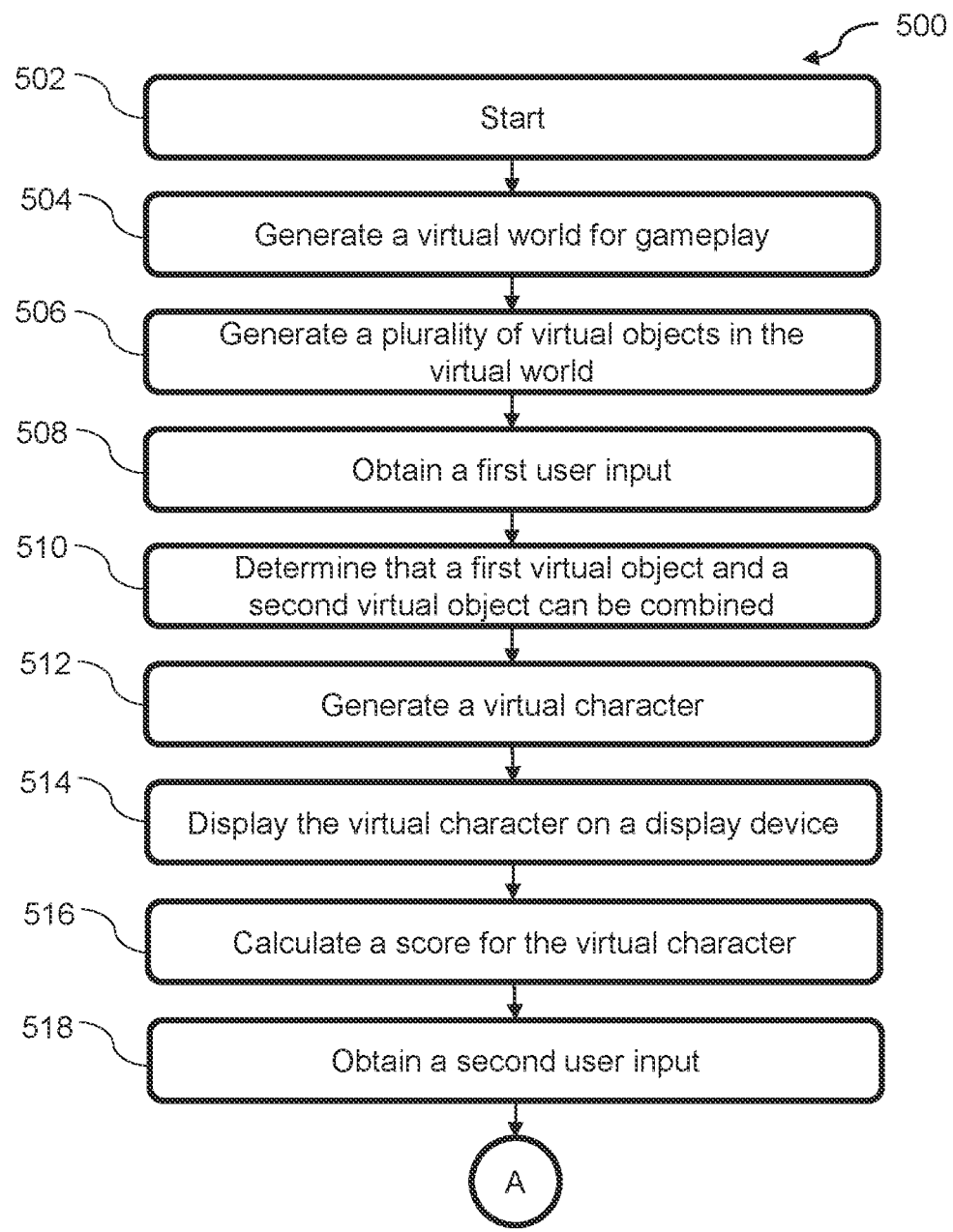
FIGS. 5A and 5B depict a flow diagram of an example second method for providing 3D gaming environment in accordance with the present disclosure.
Figure 5B:
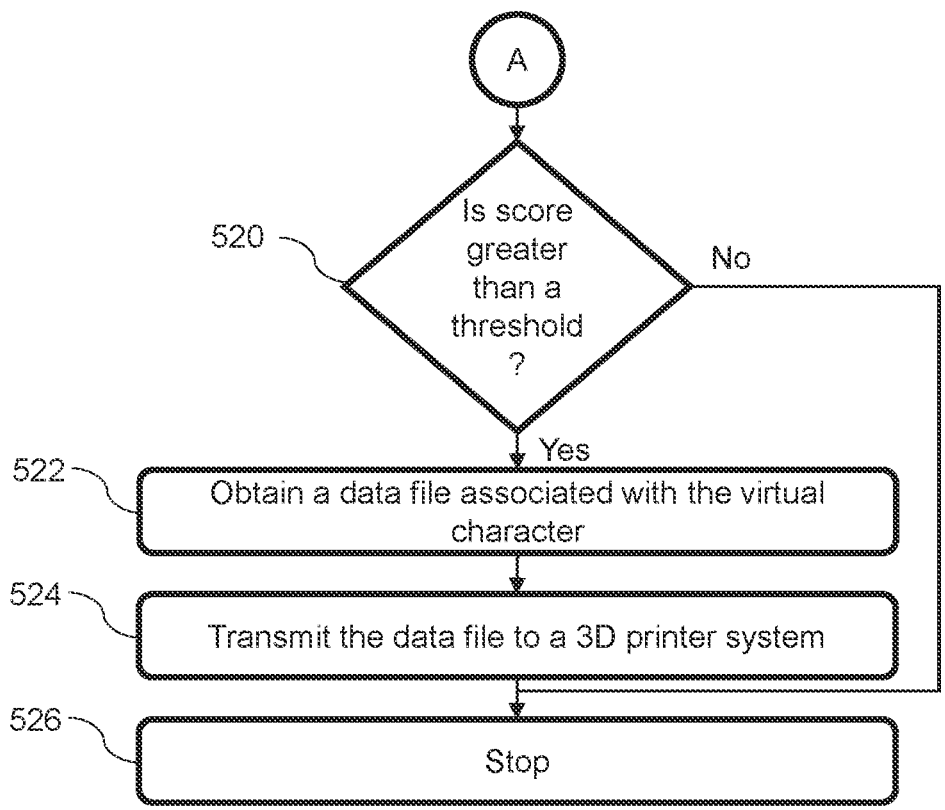

FIGS. 5A and 5B depict a flow diagram of an example second method 500 for providing 3D gaming environment in accordance with the present disclosure. FIGS. 5A and 5B may be described with continued reference to prior figures, including FIGS. 1-4. The following process is exemplary and not confined to the steps described hereafter. Moreover, alternative embodiments may include more or less steps that are shown or described herein and may include these steps in a different order than the order described in the following example embodiments.

Referring to FIG. 5A, at step 502, the method 500 may commence. Steps 504, 506, 508, 510, 512 and 514 of the method 500 may be similar to the steps 404, 406, 408, 410, 412 and 414 of the method 400, and hence are not described again here for the sake of simplicity and conciseness.

At step 516, the method 500 may include calculating, by the processor 304, the final score for the virtual character 135/140. As described above, the final score may be the first score, the second score, the third score, or a combination thereof, associated with the virtual character 135/140.

At step 518, the method 500 may include obtaining, by the processor 304, the second user input to 3D print the virtual character 135/140 into a physical object. At step 520, the method 500 may include determining, by the processor 304, whether the final score is greater than a predefined threshold. If the processor 304 determines that the final score is less than the predefined threshold, the method 500 may move to step 526, at which the method 500 may stop.

On the other hand, if the processor 304 determines that the final score is greater than the predefined threshold, the method 500 may move to step 522. At the step 522, the method 500 may include obtaining, by the processor 304, the data file associated with the virtual character 135/140. At step 524, the method 500 may include transmitting, by the processor 304, the data file to the 3D printer system 225 to 3D print the virtual character 135/140 into the physical object.

At step 526, the method 500 may end.

FIG. 6 depicts a cloud computing environment in accordance with the present disclosure. It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a service provider. This cloud model can include at least five characteristics, at least four service models, and at least four deployment models, which are described in the following section as a brief overview of example cloud computing infrastructure.

An on-demand self-service cloud model can refer to a cloud user who can unilaterally provision computing capabilities, such as server time and network storage, as needed automatically without requiring human interaction with the service's provider.

A broad network access cloud model may include capabilities that are available over a network (e.g., the network 120) and accessed through standard mechanisms that promote use by heterogeneous thin or thick client platforms (e.g., mobile phones, laptops, and personal data assistants (PDAs)).

A resource pooling cloud model may pool the provider's computing resources to serve multiple users using a multi-tenant model, with different physical and virtual resources dynamically assigned and reassigned according to demand. There is a sense of location independence in that the user may have no control or knowledge over the exact location of the provided resources but can be able to specify location at a higher Level-of abstraction (e.g., country, state, or datacenter).

A rapid elasticity cloud model may elastically provision cloud resources, and in some cases, provision them automatically, to quickly scale out and rapidly release to quickly scale in. To the user, the capabilities available for provisioning often appear to be unlimited and can be purchased in any quantity at any time.

A measured service cloud infrastructure describes cloud systems that automatically control and optimize a resource use by leveraging a metering capability at some Level-of abstraction appropriate to the type of service (e.g., storage, processing, bandwidth, and active user accounts). Resource usage can be monitored, controlled, and reported providing transparency for both the provider and user of the utilized service.

Various service models are also known in the art of cloud computing, within which information and programs (software) may be deployed on the network. For example, a software as a Service (SaaS) cloud model may provide the user the capability to use the provider's applications running on a cloud infrastructure. The applications may be accessible from various client devices through a thin client interface such as a web browser (e.g., web-based e-mail). The user does not manage or control the underlying cloud infrastructure including the network(s) 120, servers, operating systems, storage, or even individual application capabilities, apart from limited user-specific application configuration settings.

A Platform as a Service (PaaS) service model may provide the capability to the user to deploy onto the cloud infrastructure one or more user-created or acquired applications created using programming languages and tools supported by the provider. The user may not manage or control the underlying cloud infrastructure including the network(s) 120, operating systems, or storage, but can maintain control over the deployed applications and possibly application hosting environment configurations.

An Infrastructure as a Service (IaaS) service model for cloud computing may provide ability for the user is to provision processing, utilize storage via the network(s) 120, and perform other fundamental computing resources where the user is able to deploy and run arbitrary software, which can include operating systems and applications. The user does not manage or control the underlying cloud infrastructure but has control over operating systems, storage, deployed applications, and possibly limited control of select networking components (e.g., host firewalls).

A Database as a Service (DBaaS) service model describes a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems can include monitoring engines to track performance and usage, error monitoring, and data analysis engines.

Various deployment models are described hereafter, which can include, for example, a private cloud deployment model, where the cloud infrastructure is operated solely for an organization. It can be managed by the organization or a third party and can exist on-premises or off-premises.

In another example, a community cloud deployment model describes a cloud infrastructure that may be shared by several organizations and supports a specific community that has shared concerns (e.g., mission, security requirements, policy, and compliance considerations). It can be managed by the organizations or a third party either locally or remotely.

A public cloud deployment model can make the cloud infrastructure available to the general public or a large industry group, where the infrastructure is owned by an organization selling cloud services.

A hybrid cloud deployment model can include two or more clouds (private, community, or public) that remain unique entities but are bound together by standardized or proprietary technology that enables data and application portability (e.g., cloud bursting for load-balancing between clouds).

The brief introduction above provides a few basic examples of cloud computing technologies that may be utilized according to some embodiments of the present disclosure. Other computing infrastructure may be possible and contemplated.

Referring now to FIG. 6, a cloud computing environment 600 for use in practicing the teachings herein is depicted. As shown in FIG. 6, the cloud computing environment 600 may include one or more cloud computing nodes 602 with which local computing devices may be utilized used by customers, users, etc., such as, for example, a mobile device 604, a desktop computer 606, a laptop computer 608 or the computing system 205/computer system 302 as shown in FIGS. 2 and 3 can communicate. In some example embodiments, the cloud computing nodes 602 can communicate data with one another. They can be grouped physically or virtually in one or more network(s) 610, such as a Private, Community, Public, or Hybrid clouds as described hereinabove, or a combination thereof. The various types of groupings may allow the cloud computing environment 600 to provide an infrastructure, one or more platforms, and/or software as services that a cloud consumer may use independently without necessarily requiring software resources on the client side (e.g., on a local computing device such as the mobile device 604, the desktop computer 606, the laptop computer 608, etc.). It is understood that the types of computing devices 604-608 shown in FIG. 6 are intended to be illustrative only and that the cloud computing nodes 602 and the cloud computing environment 600 can communicate with any type of computerized device over any type of network and/or network addressable connection (e.g., using a web browser).

Figure 7:
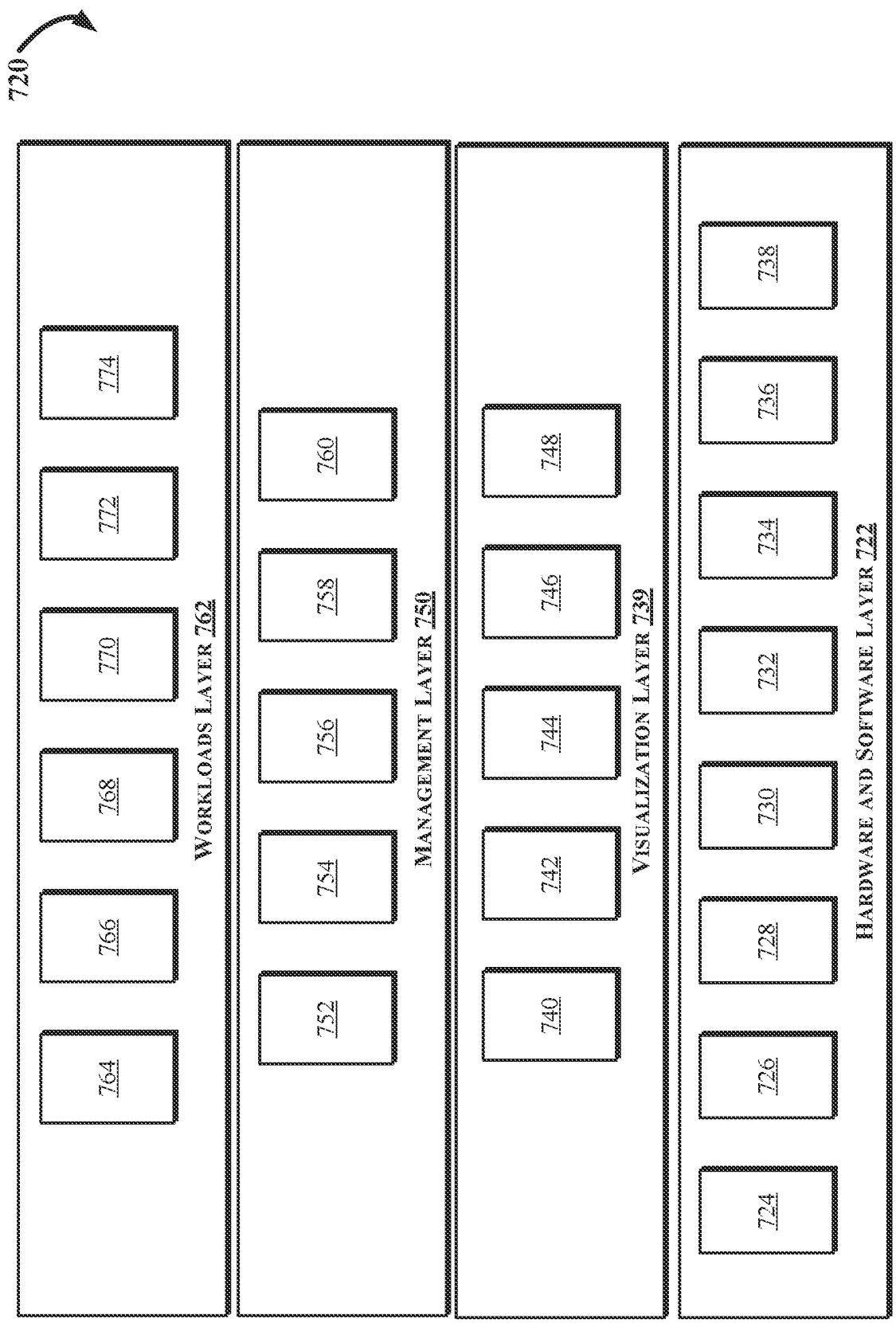
FIG. 7 depicts a plurality of functional abstraction layers provided by the cloud-computing environment of FIG. 6 in accordance with the present disclosure.

FIG. 7 depicts a plurality of functional abstraction layers 720 provided by the cloud computing environment of FIG. 6 in accordance with the present disclosure. It should be appreciated that the components, layers, and functions of the functional abstraction layers 720 depicted are illustrative only, and embodiments of the disclosure are not limited thereto. As depicted, the following layers and corresponding functions are provided:

A hardware and software layer 722 can include hardware and software components. Examples of hardware components can include, for example, mainframes 724, one or more Reduced Instruction Set Computer (RISC) and/or architecture-based servers 726, one or more servers 728, one or more blade servers 730, one or more storage devices 732, and one or more network(s) and networking components 734. In some embodiments, the software components can include network application server software 736 and/or database software 738.

A virtualization layer 739 can provide an abstraction layer from which the following examples of virtual entities can be provided: virtual servers 740, virtual storage 742, virtual networks 744, which can include virtual private networks, virtual applications and operating systems 746, and virtual clients 748.

In one example, a management layer 750 can provide the functions described below. A resource provisioning module 752 can provide dynamic procurement of computing resources and other resources that can be utilized to perform tasks within the cloud computing environment 600 (depicted generally in FIG. 6). A metering and pricing resource 754 that can provide cost tracking for one or more resources utilized within the cloud computing environment 600, and also provide for billing and invoicing for consumption of these resources. In one example, the metering and pricing resources can include monetization of game points/virtual resources, discounts for 3D modeling, access to more sophisticated 3D modeling equipment, higher quality or lower quality printing output based on monies input into the system, and other features.

A user portal 756 can provide access to cloud computing environment 600 for consumers and system administrators (not shown in FIG. 6). In some embodiments, the user portal 756 can provide security and/or identity verification for cloud consumer devices (e.g., one or more consumers operating one or more of computing devices 604-608, as shown in FIG. 6), as well as protection for data and other resources.

A service Level-management resource 758 can provide cloud computing resource allocation and management such that required service levels are met. A service Level-agreement (SLA) planning and fulfillment resource 760 can provide pre-arrangement for, and procurement of cloud computing resources for which a future requirement is anticipated in accordance with an SLA.

A workloads layer 762 can provide functionality for which the cloud computing environment can be utilized. For example, the workloads layer 762 can include a mapping and navigation resource 764, a software development and lifecycle management resource 766, a virtual delivery resource 768, a data analytics processing resource 770, a transaction processing resource 772, and a 3D virtual printing network resource 774.

In the above disclosure, reference has been made to the accompanying drawings, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

Regarding the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for 3-Dimensional (3D) model creation comprising:
    generating, by a processor, a virtual world having a plurality of virtual objects for gameplay, wherein each virtual object is associated with a physics rule;
    obtaining, by the processor, a first user input to generate a virtual character in the virtual world by combining a first virtual object and a second virtual object from the plurality of virtual objects;
    determining, by the processor, that the first virtual object and the second virtual object are combinable based on physics rules associated with the first virtual object and the second virtual object;
    generating, by the processor, the virtual character based on a determination that the first virtual object and the second virtual object are combinable;
    calculating a first character score associated with the virtual character based on a characteristic associated with the first virtual object and the second virtual object after generating the virtual character;
    determining a time duration spent by a user in the gameplay for generating the virtual character;
    calculating a second character score based on the time duration;
    correlating the first character score and the second character score;
    calculating a final score based on the correlation;
    obtaining, by the processor, a second user input to 3D print a physical object corresponding to the virtual character; and
    transmitting, by the processor, a request to a 3D printer system to 3D print the physical object responsive to obtaining the second user input when the final score is greater than a predefined threshold.

2. The method of claim 1, wherein the physics rule is associated with a shape of each of the first virtual object and the second virtual object.

3. The method of claim 1, wherein the characteristic is at least one of: a tensile strength, a shear strength, a modulus of elasticity, a melting point, a freezing point, an exothermic potential, and an endothermic potential.

4. The method of claim 1 further comprising obtaining a data file associated with the virtual character responsive to obtaining the second user input and a determination that the final score is greater than the predefined threshold.

5. The method of claim 4, wherein the request comprises the data file.

6. The method of claim 1, wherein the virtual world comprises a virtual room, and wherein the method further comprises:
    disposing the plurality of virtual objects in the virtual room based on ease or difficulty of locating the plurality of virtual objects in the virtual room; and
    obtaining the first user input responsive to disposing the plurality of virtual objects.

7. The method of claim 6 further comprising:
    obtaining a first user selection associated with a selection of the first virtual object from the virtual room, responsive to disposing the plurality of virtual objects;
    obtaining a second user selection associated with a selection of the second virtual object from the virtual room, responsive to disposing the plurality of virtual objects; and
    obtaining the first user input, wherein the first user input comprises the first user selection, the second user selection, and a request to combine the first virtual object and the second virtual object in a desired manner to generate the virtual character.

8. A system for 3-Dimensional (3D) model creation comprising:
    a 3D model generator configured to generate a virtual world having a plurality of virtual objects for gameplay, wherein each virtual object is associated with a physics rule;
    a receiver configured to receive:
        a first user input to generate a virtual character in the virtual world by combining a first virtual object and a second virtual object from the plurality of virtual objects, and
        a second user input to 3D print a physical object corresponding to the virtual character; and
    a processor configured to:
        obtain the first user input and physics rules associated with the first virtual object and the second virtual object;
        determine that the first virtual object and the second virtual object are combinable based on the physics rules associated with the first virtual object and the second virtual object;
        transmit a command to the 3D model generator to generate the virtual character based on a determination that the first virtual object and the second virtual object are combinable;
        calculate a first character score associated with the virtual character based on a characteristic associated with the first virtual object and the second virtual object after generating the virtual character;
        determine a time duration spent by a user in the gameplay for generating the virtual character;

calculate a second character score based on the time duration;

correlate the first character score and the second character score;

calculate a final score based on the correlation;

obtain the second user input; and transmit a request to a 3D printer system to 3D print the physical object responsive to obtaining the second user input when the final score is greater than a predefined threshold.

9. The system of claim 8, wherein the physics rule is associated with a shape of each of the first virtual object and the second virtual object.

10. The system of claim 8, wherein the characteristic is at least one of: a tensile strength, a shear strength, a modulus of elasticity, a melting point, a freezing point, an exothermic potential, and an endothermic potential.

11. The system of claim 8, wherein the processor is further configured to obtain a data file associated with the virtual character responsive to obtaining the second user input and a determination that the final score is greater than the first predefined threshold.

12. The system of claim 11, wherein the request comprises the data file.

13. A non-transitory computer-readable storage medium in a distributed computing system, the non-transitory computer-readable storage medium having instructions stored thereupon which, when executed by a processor, cause the processor to:

generate a virtual world having a plurality of virtual objects for gameplay, wherein each virtual object is associated with a physics rule;

obtain a first user input to generate a virtual character in the virtual world by combining a first virtual object and a second virtual object from the plurality of virtual objects;

determine that the first virtual object and the second virtual object are combinable based on physics rules associated with the first virtual object and the second virtual object;

generate the virtual character based on a determination that the first virtual object and the second virtual object are combinable;

calculate a first character score associated with the virtual character based on a characteristic associated with the first virtual object and the second virtual object after generating the virtual character;

determine a time duration spent by a user in the gameplay for generating the virtual character;

calculate a second character score based on the time duration;

correlate the first character score and the second character score;

calculate a final score based on the correlation;

obtain a second user input to 3D print a physical object corresponding to the virtual character; and transmit a request to a 3D printer system to 3D print the physical object responsive to obtaining the second user input when the final score is greater than a predefined threshold.

14. The non-transitory computer-readable storage medium of claim 13, wherein the physics rule is associated with a shape of each of the first virtual object and the second virtual object.

15. The non-transitory computer-readable storage medium of claim 13, wherein the characteristic is at least one of: a tensile strength, a shear strength, a modulus of elasticity, a melting point, a freezing point, an exothermic potential, and an endothermic potential.

* * * * *